US012381330B2

(12) United States Patent
Zaghloul et al.

(10) Patent No.: US 12,381,330 B2
(45) Date of Patent: Aug. 5, 2025

(54) ULTRAWIDE-BAND DUAL POLARIZATION THREE-DIMENSIONAL TAPERED APERTURE VIVALDI ANTENNA

(71) Applicant: U.S. Army DEVCOM, Army Research Laboratory, Adelphi, MD (US)

(72) Inventors: Amir I. Zaghloul, Bethesda, MD (US); Quang M. Nguyen, Odenton, MD (US); Theodore K. Anthony, Randallstown, MD (US); Gregory A. Mitchell, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 210 days.

(21) Appl. No.: 18/219,769

(22) Filed: Jul. 10, 2023

(65) Prior Publication Data

US 2025/0023247 A1 Jan. 16, 2025

(51) Int. Cl.
*H01Q 13/08* (2006.01)
*H01P 3/06* (2006.01)
*H01Q 21/24* (2006.01)

(52) U.S. Cl.
CPC ............ *H01Q 13/085* (2013.01); *H01P 3/06* (2013.01); *H01Q 21/24* (2013.01)

(58) Field of Classification Search
CPC .... H01Q 21/24; H01Q 13/085; H01Q 21/064; H01P 3/06
See application file for complete search history.

(56) References Cited

PUBLICATIONS

Zhang, A Compact, Ultrawideband Dual-Polarized Vivaldi Antenna With Radar Cross Section, IEEE, Jul. 2022, vol. 21, No. 7, pp. 1-3 (Year: 2022).*

Zhang, Dual-Frequency Dual-Circularly-Polarized Vivaldi Antenna Array, China Electronics Technology Group Corporation No. 38 Research Institute, Key Lab of Aperture Array and Space Application, Hefei, China, pp. 1-3 (retrieved from IEEE) (Year: Unknown).*

A. Muniyasamy and K. Rajakani, "UWB radar cross section reduction in a compact antipodal Vivaldi antenna", International Journal of Electronics and Communications, vol. 99, pp. 369-375, 2019.

(Continued)

*Primary Examiner* — Monica C King
(74) *Attorney, Agent, or Firm* — Eric B. Compton

(57) ABSTRACT

We disclose an ultrawide-band (USB) dual polarization three-dimensional (3D) tapered aperture Vivaldi antenna. It is generally comprised of a radiator having two pairs of tapering arms, each pair corresponding to a different polarization and the tapering arms spaced thereof closest to one another at a feed point location of the antenna and taper outwardly in opposite directions, thus forming a 3D Vivaldi antenna aperture therebetween; and a dual feed balun connecting to each of the two pairs of tapering arms and providing a separate channel for each of the polarizations. Embodiments of our antenna have been designed and simulated using full-wave electromagnetics commercial software. The results for our antennas demonstrate over 20:1 operating bandwidth with good radiation characteristics and very low cross polarization.

24 Claims, 10 Drawing Sheets

(56) References Cited

PUBLICATIONS

Chung, K., Pyun, S. and Choi, J., 2005. "Design of an ultrawide-band TEM horn antenna with a microstrip-type balun." IEEE Transactions on Antennas and Propagation, 53(10), pp. 3410-3413.

Ježová, Jana, and Sébastien Lambot. "A dielectric horn antenna and lightweight radar system for material inspection." Journal of Applied Geophysics 170 (2019): 103822.

Rizvi SA, Khan RA., "Klopfenstein tapered 2-18 GHz microstrip balun," Proceedings of 2012 9th International Bhurban Conference on Applied Sciences & Technology (IBCAST) Jan. 9, 2012, IEEE, pp. 359-362.

J. W. Duncan and V. P. Minerva, "100:1 Bandwidth Balun Transformer," Proceedings of the IRE, Feb. 1960, pp. 156-164.

R. Mallahzadeh, et al., "A Novel Dual-Polarized Double-Ridged Horn Antenna for Wideband Applications," Progress In Electromagnetics Research B, vol. 1, 67-80, 2008.

A. R. Mallahzadeh and F. Karshenas, "Modified TEM Horn Antenna for Broadband Applications," Progress In Electromagnetics Research, PIER 90, 105-119, 2009.

R. Todd Lee and Glenn S. Smith, "A Design Study for the Basic TEM Horn Antenna," School of Electrical and Computer Engineering, Georgia Institute of Technology, 2003.

Q.M. Nguyen, T.K. Anthony, and A.I. Zaghloul, "Ultra-wideband 3D tapered aperture antenna—3D Vivaldi antenna," IEEE Antennas and Propagation Symposium, Denver, Colorado, Jul. 10-15, 2022.

Q.M. Nguyen, T.K. Anthony, G.A. Mitchell, and A.I. Zaghloul, "Ultra-Wideband Dual-Polarization 3D Vivaldi Antenna," MSS Tri-service Radar Symposium, Tacoma, Washington, Jul. 11-14, 2022.

* cited by examiner

ULTRAWIDE-BAND DUAL POLARIZATION THREE-DIMENSIONAL TAPERED APERTURE VIVALDI ANTENNA

GOVERNMENT INTEREST

The invention described herein may be manufactured, used and licensed by or for the U.S. Government without the payment of royalties thereon.

RELATED DISCLOSURES

Some aspects relating to this invention have been previously disclosed by the inventors in the following:

Ref. [1]: Q. M. Nguyen, T. K. Anthony, and A. I. Zaghloul, "Ultra-wideband 3D tapered aperture antenna-3D Vivaldi antenna," IEEE Antennas and Propagation Symposium, Denver, Colorado, 10-15 Jul. 2022; and Ref. [2] Q. M. Nguyen, T. K. Anthony, G. A. Mitchell, and A. I. Zaghloul, "Ultra-Wideband Dual-Polarization 3D Vivaldi Antenna," MSS Tri-service Radar Symposium, Tacoma, Washington, 11-14 Jul. 2022, both of which are herein incorporated by reference in their entireties for all purposes.

BACKGROUND OF THE INVENTION

Field

Embodiments of the present invention are directed to antennas, and more particularly, to a novel ultrawide-band dual polarization 3D tapered aperture Vivaldi antenna.

Description of Related Art

Commercial and military mobile wireless systems generally need a high data rate to deliver high quality, low latency video and multimedia applications. Moreover, future 5G/6G technology will most likely also require new operating bands to obtain wider bandwidth than the current wireless technology. There, however, continues to be challenges for wireless communication system to provide wider bandwidth.

Ultra-wideband (UWB) antennas are considered a desirable way to cover different frequency bands. Many such designs have been published, including planar monopole antennas, printed antenna, and leaky lens antenna, etc. A Vivaldi antenna, for instance, is considered one of the best candidates for UWB antennas due to its planar structure, high gain, low cost, light weigh, and ease of fabrication in addition to broadband performance. The UWB characteristics of Vivaldi antenna is derived from the tapered slot in its 2D design. Vivaldi antennas may be classified into different types according to their tapered curves. Among various designs of Vivaldi antenna, the antipodal Vivaldi antenna is considered as a popular one because it can provide a wider bandwidth and low cross polarization than other conventional Vivaldi antennas.

Bandwidth tends to be the limiting factor for any antenna design. Planar tapered slot antennas, like Vivaldi antennas, may provide high gain, low cost, light weight, and ease of fabrication. However, while these antennas offer UWB bandwidth with relatively high gain, the cross-polarization isolation (CPI) is typically only small, i.e., between 15-20 dB. In view of the foregoing, improvements for UWB antennas are desired.

BRIEF SUMMARY OF THE INVENTION

Herein, we disclose ultrawide-band (UWB) dual polarization three-dimensional (3D) tapered aperture Vivaldi antennas. Our novel antenna designs build upon a typical 2D tapered slot Vivaldi antenna. Unlike the planar conventional Vivaldi-type antenna, our antenna designs are based on (two pairs of) tapering antenna arms and extends in opposite direction to create 3-D tapered aperture. In other words, our antenna transforms the tapered slot in conventional antipodal Vivaldi antenna to 3-D tapered aperture. The designs can also be considered as a 3D version of the Vivaldi antenna.

It is comprised of a radiator having two pairs of tapering arms, each pair corresponding to a different polarization and the tapering arms spaced thereof closest to one another at a feed point location of the antenna and taper outwardly in opposite directions, thus forming a 3D Vivaldi antenna aperture therebetween; and a dual feed balun connecting to each of the two pairs of tapering arms and providing a separate channel for each of the polarizations.

The tapering arms may be formed of metal or alloy as non-limiting examples. The tapering arms of the two pairs of tapering arms may each have a length L and a width w, and taper from a minimum spacing distance therebetween $d_0$ at the feed point to a maximum spacing distance therebetween $d_L$ at the aperture point in a direction z. The tapering arms can each have an exponential or linear taper, for instance. In the case of an exponential taper, the spacing d of the tapering arms of the two pairs of tapering arms (which are across from each other) may be given as an exponential function of the distance in the direction z as follows: $d(z)=d_0e^{bz}$, where $$b = \frac{1}{L}\ln\left(\frac{d_L}{d_0}\right).$$

The width w of the tapering arms of the two pairs of tapering arms can be given as a function of the distance in the direction z as follows:

$$w(z) = \frac{d(z)}{Z(z)}\eta,$$

where Z(z) is the characteristic impedance as a function of z and n is the free space impedance.

The two pairs of tapering arms are arranged 90 degrees with respect to one another to keep the polarization channels isolated. Preferably, there is at least 25 dB of isolation between the polarization channels.

In some embodiments, the antenna aperture is air-filled. In others, the aperture is at least partially filled with a dielectric material. The top surface of the dielectric material in the aperture can be substantially flat. More, the dielectric material can further include a convex-shaped dome extending from the center of its top surface which focuses RF energy to the aperture. For instance, the convex-shaped dome may be a radially symmetrical sector of a hemispherical dome.

The dual feed balun can be comprised of two coaxials, one feeding each polarization channel of the antenna. The coaxials may coaxial cables, for instance. In an embodiment, the coaxials are offset at different heights in the z-axis and in the x and/or y axis. In another, they are located at the same height but offset in the x and/or y axis. In various embodiments, the dual feed balun can be comprised of two microstrip tapered baluns or two coaxial tapered baluns. The dual feed balun comprises two baluns which are: (i) arranged in opposing directions with the polarization of two baluns oriented 90 degrees with respect to each other, or (ii) arranged at right angles with respect to one other with the polarization of the two baluns oriented in the same direction, to maintain cross-polarization isolation.

According to embodiments, the antenna is preferably configured to have an operating frequency of about 2-40 GHz, a 20:1 bandwidth, 2-17 dB of gain, a return loss of better than-10 dB, and at least 30 dB cross-polarization isolation (CPI) up to about 35 GHz.

We present four exemplary cases (embodiments) for our ultrawide-band dual polarization 3D tapered aperture Vivaldi antennas herein. In case 1, the aperture is air filled; the length L is about 110 mm and the maximum spacing distance therebetween $d_L$ is about 123 mm. In case 2, the aperture is filled with a dielectric material having a dielectric constant of about 2.2 with a flat top surface; the length L is about 75 mm and the maximum spacing distance therebetween $d_L$ is about 83 mm. In case 3, the aperture is filled with a dielectric material having a dielectric constant of about 2.2 with a flat top surface and a convex-shape dome extending about 20 mm above the center of the top surface thereof; the length L is about 75 mm and the maximum spacing distance therebetween $d_L$ is about 83 mm. And, in case 4, the aperture is filled with a dielectric material having a dielectric constant of about 2.2 with a flat top surface and a convex-shape dome extending about 20 mm above the center of the top surface thereof; the length L is about 55 mm and the maximum spacing distance therebetween d is about 83 mm.

These and other embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIG. 1A is a 3D view and FIG. 1B is a bottom view of the antenna.

FIG. 4A shows case 1 which is air-filled, FIG. 4B shows case 2 which is filled with dielectric material with smaller footprint, FIG. 4C shows case 3 having a RF focusing dome formed of dielectric material, and FIG. 3D shows case 4 which also has a RF focusing dome, but with reduced height.

FIG. 7A shows a configuration of the individual baluns of the dual feed balun arranged in opposing directions with respect to one another, and FIG. 7B shows another antenna configuration for the individual baluns of the dual feed balun arranged at right angles with respect to one another.

FIG. 8A shows a microstrip tapered balun which can be used for each of the individual baluns for the dual feed balun in accordance with an embodiment, and FIG. 8B shows a coaxial tapered balun which can be used for each of the individual baluns for the dual feed balun in accordance with an embodiment.

FIG. 9A is a 3D view, FIG. 9B is a left view, FIG. 9C is a right view, and FIG. 9D is a bottom view of the first dual coaxial balun.

FIG. 10A is a 3D view, FIG. 10B is a left view, FIG. 10C is a right view, and FIG. 10D is a bottom view of the first dual coaxial balun.

DETAILED DESCRIPTION

We believe there is a need for UWB antennas including UWB coverage of 20:1 bandwidth or better, while maintaining gain, directivity, real time beam shaping and beam steering, and polarization agility. A cross polarization rejection of at least 40 dB is also desired across the entire bandwidth for the identification and isolation of specific threats from ambient RF signals. High cross-polarization isolation helps to increases the channel capacity (i.e., bits per second achievable over a wireless link) of the wireless communication network by reducing the equivalent noise components that come from other ambient cross polarized wireless signals. Our antenna embodiments offer such a solution for high cross-polarization isolation of −40 dB over the 20:1 bandwidth, with small dimensions. This increases the bandwidth capacity of the communication system several times relative to what is currently available.

Additionally, another issue is the large dimensions of typical 2D Vivaldi antennas. By creating a 3D Vivaldi-like aperture, this enables us also to fill the aperture with a high dielectric to reduce the size of the aperture and allows using additive manufacturing for its fabrication. This would not be realizable in a traditional 2D implementation which is essentially flat.

Figure 1A:
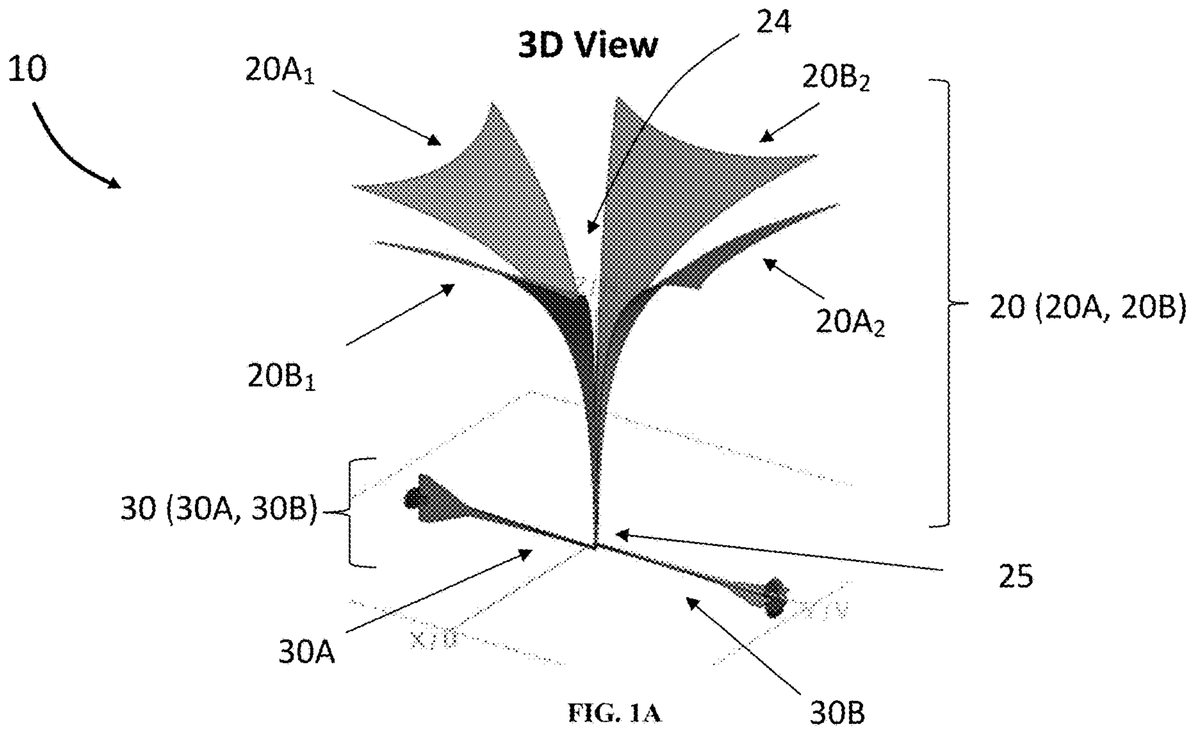
FIGS. 1A and 1B show an ultrawide-band (UWB) dual polarization 3D tapered aperture Vivaldi antenna according to an embodiment of the present invention where
Figure 1B:
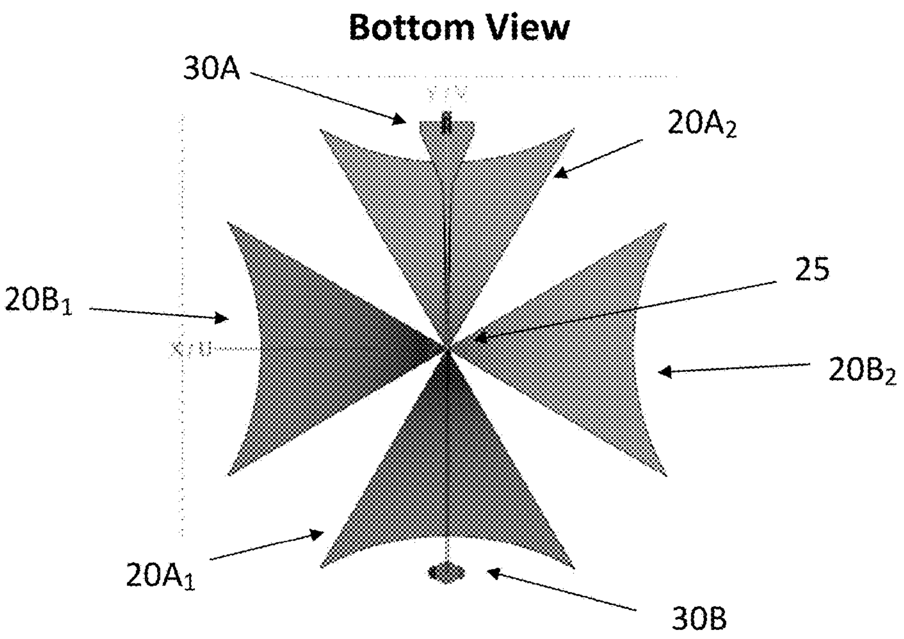

FIGS. 1A and 1B show an ultrawide-band (UWB) dual polarization 3D tapered aperture Vivaldi antenna 10 according to an embodiment of the present invention. The antenna 10 is adapted for ultra-wideband (UWB) operation of 2-40

GHz and provides high cross-polarization isolation radiation performance. Commercially, this bandwidth is utilized for many 5G/6G applications.

The antenna 10 is generally comprised of a radiator 20 formed of two pairs 20A, 20B of tapering arms 20$A_1$/20$A_2$ and 20$B_1$/20$B_2$, respectively. The arms 20$A_1$, 20$A_2$, 20$B_1$, 20$B_2$. are designed to radiate/receive received radio waves. The radiator 20 can receive an electrical signal and radiate radio frequencies corresponding the electrical signal. Similarly, it can receive radio waves and provide a corresponding electrical signal. Depending on intended operation, the antenna 10 may be a "transmit" antenna, a "receive" antenna or both a "transmit and receive" antenna to provide full duplex capability.

The respective tapering arms 20$A_1$/20$A_2$ and 20$B_1$/20$B_2$ of the two pairs 20A, 20B taper and/or flare outwardly at the top of the radiator 20 in opposing directions from each other. Various tapers are contemplated. This forms a tapered 3D aperture 24 for the antenna 10 which we refer to as a "3D Vivaldi antenna aperture."

A key premise of producing the ultra-wideband response with high cross polarization isolation response is the taper of the 3D aperture produces the ultra-wide bandwidth similar to the tapered slot 2D Vivaldi antenna. The use of the tapered 3D aperture 24 allows the radiation to be generated from a parallel electromagnetic field distribution with no or minimal cross-polarization content, hence the high cross-pol isolation performance of the antenna. The parallel EM field distribution results from the parallel plate aperture. The 3D nature of our antenna designs also allows a dielectric material fill to reduce the antenna's volumetric dimensions that would not be possible with a conventional 2D Vivaldi design. The tapered aperture 24 in our antenna 10 is the 3D equivalent of a 2D antipodal Vivaldi tapered slot.

It should be noted that the material and shape of the aperture 24 directly affects the gain value across the antenna's 10 bandwidth. To improve and stabilize the gain at the mid-frequency band (e.g., 5-20 GHz), we introduce air-filled aperture embodiments. We also consider dielectric filled aperture embodiments, later discussed. One may need to alter the aperture's 24 dimensions to achieve a balance between the gain and the profile of the antenna depending on the application.

Each of the pairs 20A, 20B corresponds to a different polarization and provides a separate polarization channel for the dual polarization antenna. The tapering arms 20$A_1$/20$A_2$ and 20$B_1$/20$B_2$ of the pairs 20A and 20B of tapering arms are spaced closest to one another (but do not connect or touch) at a feed point 25 located at the bottom of the radiator 20 of the antenna 10. This means that arm 20$A_1$ is oriented 180 degrees from arm 20$A_2$ and arm 20$B_1$ is oriented 180 degrees from 20$B_2$ in the x-y plane as shown. And that the two pairs 20A, 20B of tapering arms are arranged at a right angle (90 degrees) with respect to one another. Thus, arm 20$A_1$ is rotated 90 degrees from arm 20$B_1$ and arm 20$A_2$ is rotated 90 degrees from 20$B_2$ in the x-y plane as shown. This arrangement provides a dual polarization antenna which produces a very low cross-polarization levels between the channels. This is true whether the antenna is used for single or dual polarization application.

The four corners of the radiator 20 of the antenna 10 are considered open. That is, there is a physical space between adjacent antenna arms 20$A_1$, 20$A_2$, 20$B_1$, 20$B_2$. Thus, they are not in electrical contact. We note that that this in contrast to conventional horn antennas (e.g., whether rectangular, corrugated, or conical) that are closed and can be configured to provide transverse electric (TE) mode or traverse magnetic (TM) mode aperture distributions. Due to TE or TM modes in the conventional horn antennas, their bandwidth is limited. Our novel antenna designs provide transverse electric and magnetic (TEM) mode because of the lack of the side/corner contacts. We utilize parallel plate configuration to achieve TEM mode which extends the bandwidth much further. The tapering variation in the parallel plate of the antenna smooths out the impedance transition from antenna to free space which can cover the ultra-wide bandwidth in a short distance. This results in small outside dimensions, producing the right low-cross-polarized mode, over very wide bandwidth.

At the antenna feedpoint 25, a dual feed balun 30 connects to each of the two pairs 20A, 20B of tapering arms to provide a separate channel for each of the polarizations. The dual feed balun 30 is also wide and configured as the "right match" at the antenna feed 25.

The dual feed balun 30 electrically connects two electrical channels to the polarization channels of the radiator 20. It is comprised of two baluns 30A and 30B, one for each of the pairs 20A and 20B. Thus, it provides electrical signals to and/or receives them form each of the two pairs 20A, 20B of tapering arms 20$A_1$, 20$A_2$, 20$B_1$ and 20$B_2$.

In general, the individual baluns 30A and 30B of the dual feed balun 30 serve namely two purposes: (i) they transform the impedance from the input signal to that of the antenna (e.g., 50Ω to 200Ω), and (ii) they will also transition from unbalanced coaxial connector to a (side-by-side) balanced feed of the antenna.

We have simulated and built dual-polarized 3D tapered Vivaldi antennas that operates from 2-40 GHz. Our design achieves close to a 20:1 operational bandwidth. The gain value reaches an average value of 10 dBi at 3 GHz for the air-filled case and 15 dBi for-dielectric-filled case. Both cases also exhibit cross-polarization isolation (CPI) better than 30 dB from 3-30 GHz and 25-30 dB from 30-40 GHz.

Figure 2:
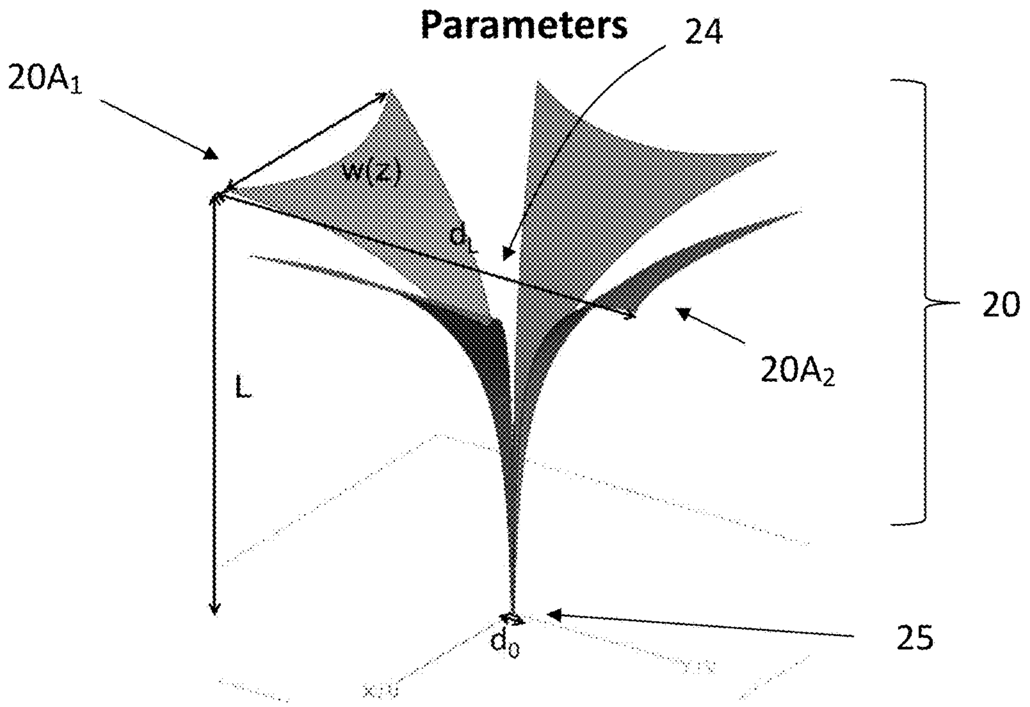
FIG. 2 shows some key parameters of the radiator of the ultrawide-band 3D-tapered aperture Vivaldi antenna according to embodiments.

FIG. 2 shows some key parameters of the radiator 20 of the ultrawide-band 3D-tapered aperture Vivaldi antenna 10 according to embodiments. In this figure, the two pairs 20A and 20B of tapering arms 20A and 20B are largely identical, just oriented at approximately right angles (90°) to one another. We just explain the relationships for the first pair 20A of tapering arms 20$A_1$ and 20$A_2$, although, it should be appreciated that we used the same relationships for the second pair 20B of tapering arms 20$B_1$ and 20$B_2$.

Thus, as depicted there, the respective tapering arms 20$A_1$ and 20$A_2$ of the first pair 20A of tapering arms each have a length L and a width w, and taper from a minimum spacing distance therebetween do at the feed point to a maximum spacing distance therebetween dy at the aperture point in a direction z. In some embodiments, the tapering arms of the pair of tapering arms each have an exponential taper. Although, it should be appreciated that other tapering may be used, such as a linear taper, in other embodiments.

To improve the cross-polarization isolation (CPI) while maintaining bandwidth and gain, we utilize opposing tapered lines, á la conventional 2D Vivaldi designs, plotted in the xz-plane with tapering exponent variation in the z direction, and transform them into a 3D coordinate system by extending around the z-axis to realize a parallel plate flared xy-aperture with a TEM-mode. The extension or rotation of the four arm surfaces in opposite directions create the 3D tapered aperture 24. The arms may extend, for instance, up to +45° in the xy plane.

In other words, the proposed design transforms the tapered slot of a conventional antipodal 2D Vivaldi antenna to a 3D tapered parallel-plate aperture that somewhat resembles a horn antenna without corned sidewalls. To reduce its overall dimensions, we can also fill the 3D-tapered aperture with dielectric material. The size reduction is proportional to the square root of the dielectric constant of the fill material. We have verified designs for our antennas via simulation using full-wave FEKO electromagnetic modelling software developed by Altair Engineering. Our simulated results demonstrate a 20:1 operating bandwidth with good radiation characteristics and improved CPI versus the traditional 2D-Vivaldi antenna. The results are documented in our Referenced Papers [1] and [2].

In some embodiments, the tapering (or widening) of the four antenna arms 20$A_1$, 20$A_2$, 20$B_1$, 20$B_2$ may be of an exponential nature and described using Eqs. (1) and (2), as follows:

$$d(z) = d_0 e^{bz}, \tag{1}$$

$$b = \frac{1}{L}\ln\left(\frac{d_L}{d_0}\right) \tag{2}$$

Here, $d_0$ and $d_L$ are distances at the feed and at the top of the aperture 24 for the respective antenna arms 20$A_1$ and 20$A_2$ of the first pair 20A of tapered antenna arms, respectively. L is the length of the antenna arm 20$A_1$ or 20$A_2$. The width of the arms 20$A_1$, 20$A_2$ can be described using Eq. (3) as follows:

$$w(z) = \frac{d(z)}{Z(z)}\eta, \tag{3}$$

where Z(z) is the characteristic impedance as a function of z and n is the free space impedance. The other pair 20B of antenna arms will be similarly configured.

Here, η has a value of 120*π Ohms (~376.73 Ohms) for air-filled embodiments. If the 3D aperture is filled with a dielectric material, as in some embodiments, then the free space impedance is replaced with the impedance of the dielectric material.

Z(z) will vary from 160 Ohms to n with respect to its height (z axis) in the 3D Vivaldi antenna. Since we desire a smooth impedance transition from the feed to the aperture of the antenna (160 Ohms to n), in our antenna designs, we can use an exponential function for the transition in some embodiments. The formula can be written in Eq. (4) as follows:

$$Z(z) = Z_{in} * e^{(\alpha * z)}, \tag{4}$$

where $Z_{in}$ is the impedance at the antenna feed. Alpha (α) represents a "tune" factor and may be defined in Eq. (5) as follows:

$$\alpha = \frac{1}{L} * \ln\left(\frac{120 * \pi}{Z_{in}}\right) \tag{5}$$

The tapering antenna arms 20$A_1$, 20$A_2$, 20$B_1$, 20$B_2$ may be fabricated from an electrically conductive material suitable for antennas and known to those in the art. These may generally include various metals and alloys. Copper, aluminum or their alloys may be used as non-limiting examples.

We bend or flare two the pairs of arms 20$A_1$/20$A_2$, and 20$B_1$/20$B_2$ in opposite directions to form cross flared shape and to form a tapered aperture 24. This gives us two distinct orthogonal linear polarization channels for the antenna 10 corresponding to the two pair of arms. The curvature in the x-y plane can be circular or constant (straight line) for each value of z. The lines can bend angle around the z-axis, as defined above, between them (e.g., −30° to)+30° define the tapered aperture. To help with ease of fabrication, we can flatten the arms. In other words, in some embodiments, the arms can be curved in only one axis, z-, instead of two axes, z and x- and/or y-. As presented in our previous work, see our Referenced Paper [1], we have found that there is no significant change in the performance between those cases.

The material of the tapering antenna arms 20$A_1$, 20$A_2$, 20$B_1$, 20$B_2$ and their thickness will have some impact on antenna performance; although, in general, we do not believe they are that critical. Their choice and effects may be evaluated by simulation for instance.

For beam steering applications, an array of 3D Vivaldi antennas 10 could be used to provide the potential for hemispherical radiation coverage.

In some embodiments, the aperture 24 space encompassed by the four antenna arms 20$A_1$, 20$A_2$, 20$B_1$, 20$B_2$ can be partially or fully filled with dielectric material to reduce its overall dimensions. This enables the dimensions of the dual polarization 3D Vivaldi antenna 10 to be reduced. We base the concept on the fact that the dimensions of a parallel plate or rectangular waveguide will shrink by filling the waveguide with high dielectric or magnetic material. The dimensions of the dielectric-filled antenna are reduced by the square root of the dielectric constant of the fill material. Later, we explore these embodiments with the description of antenna cases 1-4 (See FIGS. 4A-4D). In order to verify our antenna design concepts, we simulated both the air-filled and dielectric-filled designs using FEKO electromagnetic modelling software. Data, presented in our Referenced Paper [2], shows that the dielectric-filled 3D tapered aperture design reduces the profile of the air-filled design (e.g., by at least 33%) and the overall cubic volume (e.g., by at least 73%).

The aperture 24 has a cross-sectional area of $d_0^2$ at the bottom near the feedpoint 25 and a cross-sectional area of $d_L^2$ at the top of the radiator 20. The cross-section area varies between the two points as a function of the length L based on Eqs. (1) and (2).

Figure 3A:
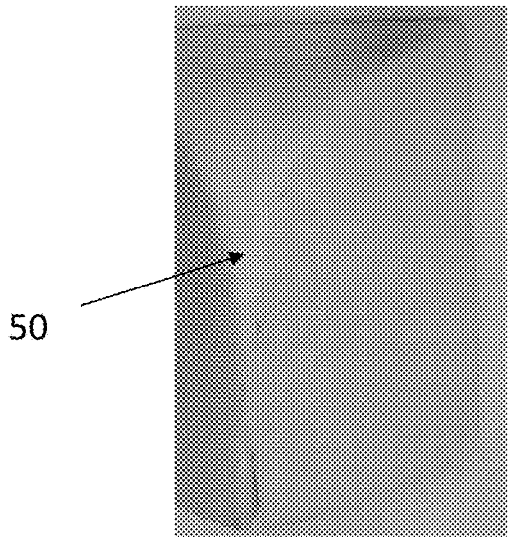
FIGS. 3A and 3B are photographs showing a support housing for the ultrawide-band 3D-tapered aperture Vivaldi antenna according to embodiments.

For mechanical support, the arms may be supported by an electrically non-conducting housing (not shown) known as a butterboard. As an example, the housing may be formed of one or more pieces such as a foam, for instance, urethane, having a dielectric constant of approximately 1.2 and preferably closer to 1 which does not affect RF performance of 3D dual polarization of the 3D Vivaldi antenna. FIG. 3A is a photograph of a piece of the supporting foam structure 50 for the antenna 10.

Figure 3B:
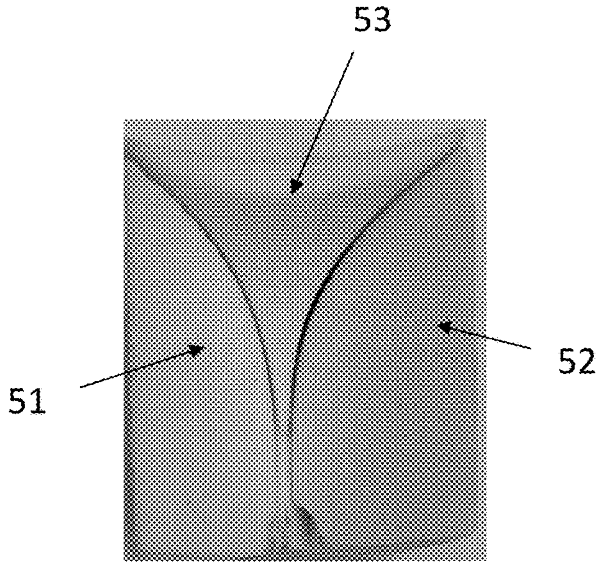

The one or more housing pieces can be arranged around (and/or inside the aperture 24, if room). The piece(s) conform to the shape and size of the tapering antenna arms 20$A_1$, 20$A_2$, 20$B_1$, 20$B_2$. We refer to the butterboard pieces as a "side" (if on the side) or a "hat" (if on the top). FIG. 3B is another photograph showing three foam pieces (i.e., two sides 51 and 52 and one hat 53) which together provide a supporting housing.

To study and evaluate configurations and subsequent effects of the 3D Vivaldi antenna, we present four cases (embodiments) in FIGS. 4A-4D. Case 1 (shown in FIG. 4A) is an air-filled case. It has a height of 110 mm and a maximum width at its top of 123 mm. The dimensions of this antenna case were selected based on the lowest intended operating frequency (in this case, it is 2 GHz). This antenna size was designed to be close to this wavelength.

For case 2 (shown in FIG. 4B), we filled the dual polarization 3D Vivaldi antenna with dielectric material. By doing so, we can shrink the size the dual polarization 3D Vivaldi antenna compared to case 1. As one can see, the profile of the antenna is reduced by factor of square root of the dielectric constant of filled material. Indeed, the wavelength in the dielectric material is shorter than wavelength in free-space (air), the relationship is given in Eq. (6) as follows:

$$\lambda_{dielectric} = \frac{\lambda_{free\text{-}space}}{\sqrt{\varepsilon_r}} \tag{6}$$

In this case, we filled the antenna aperture to its top with additively manufactured polymetric material which has RF properties of or similar to RT/duroid 5880. The material has a dielectric constant ($\varepsilon_r$) of 2.2. Here, the top surface of the dielectric material is flat. This reduces the overall height to 75 mm (55 mm+20 mm) and a width at the top of 83 mm.

The gain performance of the dielectric-filled antenna may degrade due to the reduction in aperture size, and because the dielectric material creates an impedance mismatch at the dielectric air interface. To address this issue, we introduce a dielectric dome on top of the aperture which acts like a lens to increase the overall gain. This is shown for case 3 (FIG. 4C), where we put a convex-shaped dome on top of the antenna of case 2. The purpose of the dome is to focus RF energy to the center of the aperture, and we want a structure that can gradually guide the energy to that location. That means the cross-sectional size (area) of the dome should become smaller when we go up in height (in the z direction). We also want it to be radially symmetric due to dual-pol configuration. Here, we chose a dome that is configured as a sector of a hemispherical dome. (Note: the dome is not quite half of a sphere, but a sector of a sphere with subtended angle less than 180 degrees). It has a height of 20 mm at the center, its highest point. Thus, with the selected dome, the overall height is now 95 mm (75 mm+20 mm) and the width at the top remains 83 mm. While we chose this dome shape for our evaluation here, it should be appreciated, that other domes shapes meeting the aforementioned criteria could be used instead in other embodiments.

Finally, in the case 4 (shown in FIG. 4D), we intentionally reduced the height of the antenna is case 3 so that it has the same height as the case 2. More particularly, we wanted to increase the antenna gain but we did not want to increase its profile. Putting a dome on top will increase antenna's profile as in case 3, although, we wanted it to have the same height as case 2. Thus, the overall height here is 75 mm the width at the top is still 83 mm.

Figure 4A:
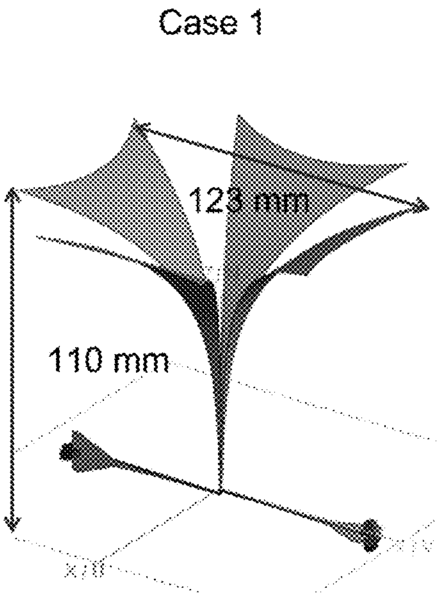
FIGS. 4A-4D show four cases (embodiments) of the 3D Vivaldi antenna, where
Figure 4B:
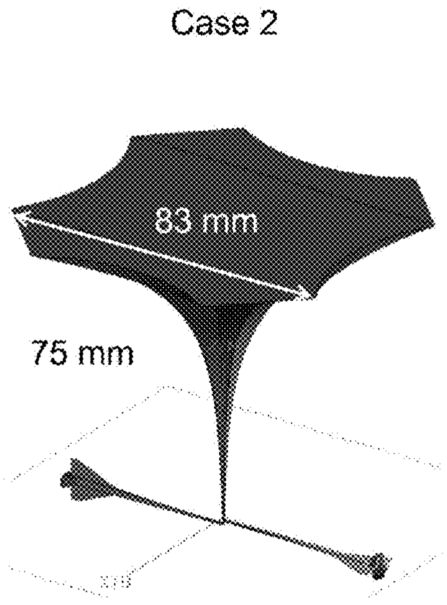
Figure 4C:
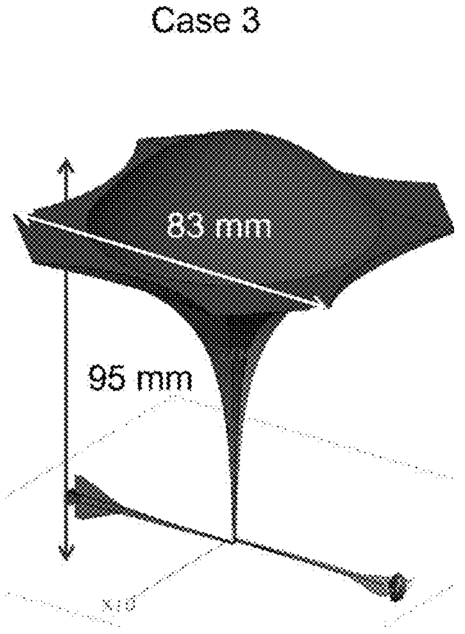
Figure 4D:
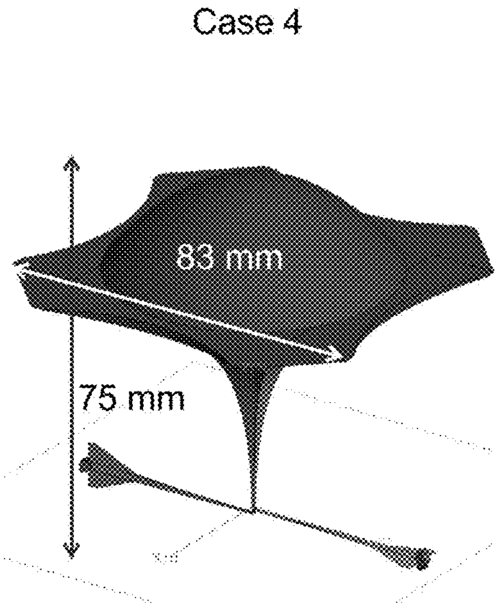
Figure 5:
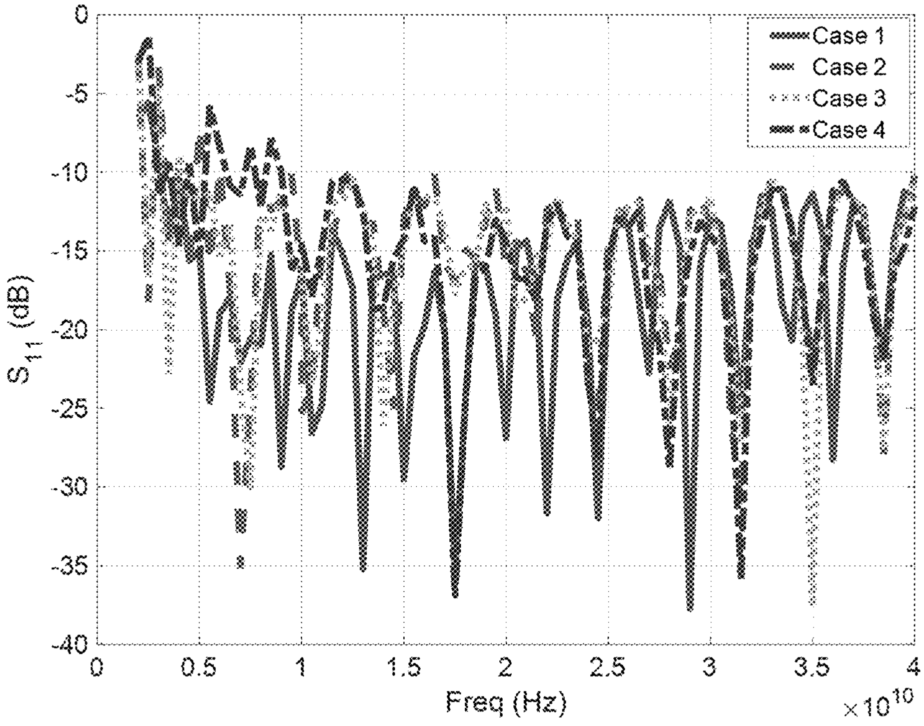
FIG. 5 is a plot showing the return loss over the frequencies of about 2 to 40 GHz for the four antenna cases shown in FIGS. 4A-4D.

FIG. 5 is a plot showing the return loss (Si measured in dBs) over the frequencies of about 2 to 40 GHz for the four antenna cases shown in FIGS. 4A-4D. As can be readily appreciated from this plot, the four antenna cases have the same general performance for the return loss. It also demonstrates that filling the antenna aperture with dielectric material does not substantially affect the return loss of the antenna either.

Figure 6:
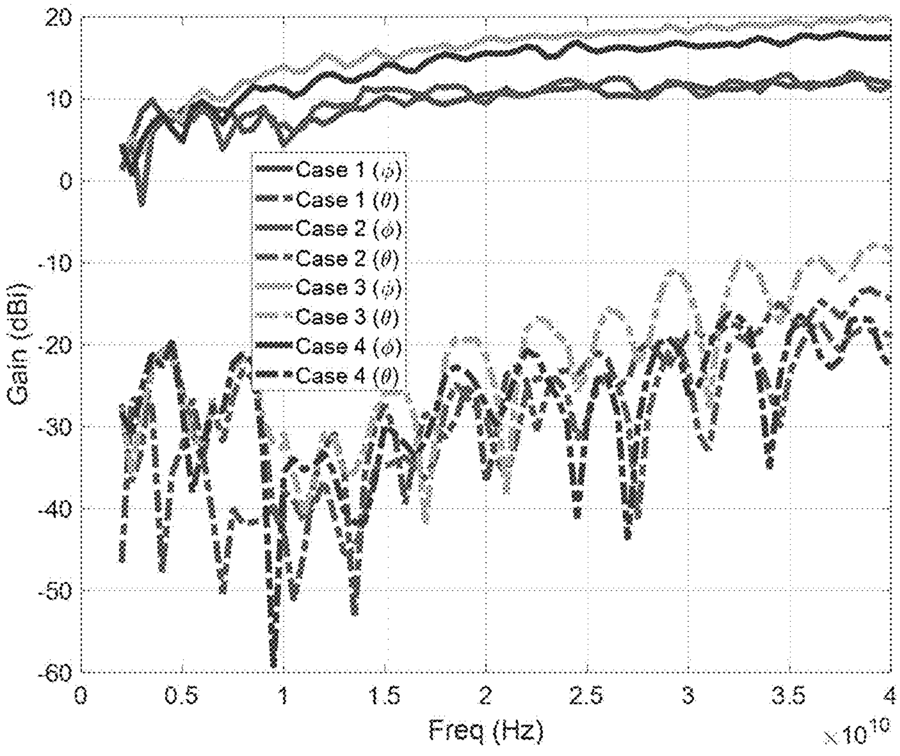
FIG. 6 is a plot showing the co-polarization gain versus the cross-pol gain for the four antenna cases shown in FIGS. 4A-4D.

FIG. 6 is a plot showing the co-pol gain (phi, φ) versus the cross-pol gain (theta, θ) for the four antenna cases. The data demonstrates there is at least 35 dB isolation between the polarization channels for the four cases. Furthermore, we see an average 30 dB CPI for them where CPI is better than 30 dB from 2-40 GHz and 25-30 dB from 30-40 GHz for both cases. This is an improvement over the 15-20 dB CPI of a typical 2D Vivaldi.

To summarize, as one can see from the data in the plots of FIGS. 5 and 6, case 2 (FIG. 4B) has similar performance as case 1 (FIG. 4A), but with a smaller footprint. Thus, by filling the dielectric material in the dual polarized 3D Vivaldi antenna, we demonstrate that we can shrink its size while maintaining its RF performance as compared in the air-filled case. To further enhance the gain of dual polarization 3D Vivaldi antenna, we put a convex-shaped dome on the top of the aperture which can act as a lens to help focus the RF energy resulting in higher gain across the bandwidth.

The data shows that case 3 (FIG. 4C) has much higher gain than cases 1 and 2 (FIGS. 4A and 4B), although, it also has larger profile than case 2 due to included dome shape. To strike the balance between the profile and the gain of the antenna, we introduced case 4 (FIG. 4D). Case 4 has the same profile as case 2 while offers significantly higher gain than case 2. Although case 4 has lower gain than case 3, its profile is also smaller. The cross-polarization isolation in case 4 is also highest among the four cases. It should be noted that using higher dielectric material in filling may result in smaller profile, however, the bandwidth and the gain performance may severely be affected due to impedance mismatch.

Figure 7A:
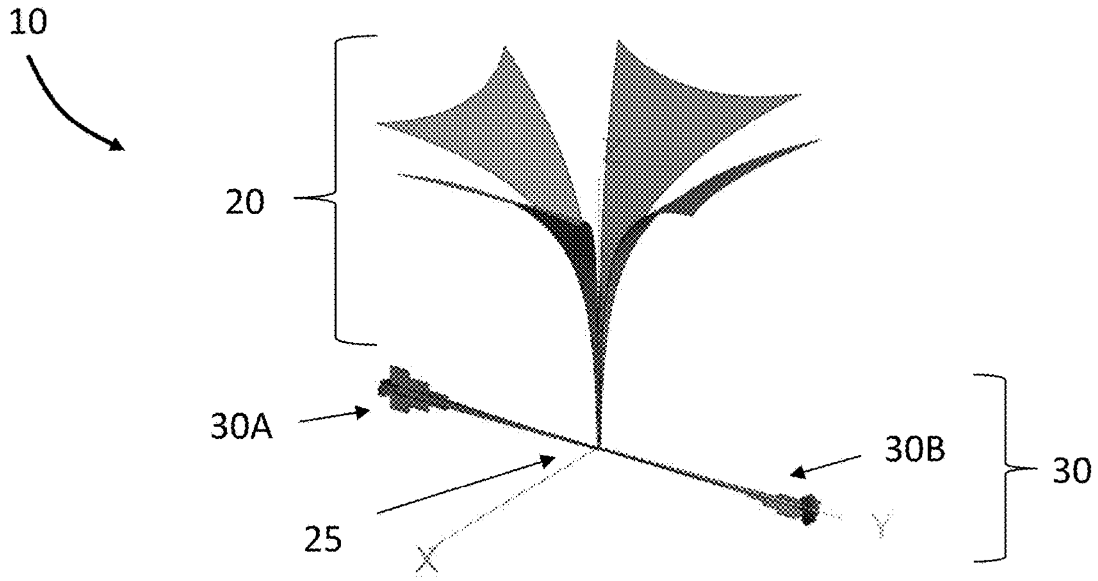
FIGS. 7A and 7B show two configurations of the dual feed balun according to embodiments where
Figure 7B:
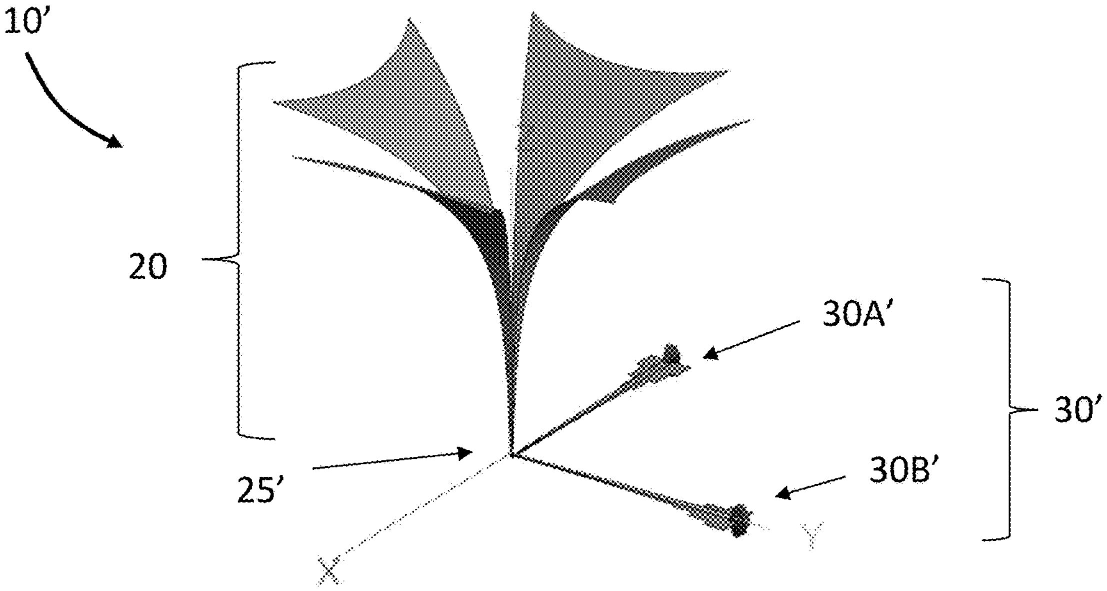

FIGS. 7A and 7B show two exemplary configurations of the dual feed balun 30 according to embodiments. FIG. 7A shows a configuration of the individual baluns 30A and 30B of the dual feed balun 30 arranged in opposing directions (approximately 180° degrees) with respect to one another. We refer to this as a "branch out" configuration. Because the two polarizations for the respective arms 20$A_1$, 20$A_2$, 20$B_1$, 20$B_2$ are oriented 90 degrees with respect to each other, if the two baluns 30A, 30B are located on the same axis (here, one is on plus side and the other one is on minus side), their polarization will need to be oriented 90 degrees with respect to each other. We have found that the branch out configuration shown here may be beneficial for some embodiments and applications because it offers the best cross-polarization isolation.

FIG. 7B shows an alternative antenna 10' configuration for the individual baluns 30A' and 30B' of the dual feed balun 30'. Here, one balun 30A' is positioned on the x axis and the other balun 30B' is on the y axis. The two baluns connect with the arms of the radiator 20 near the feed point 25'. Because they are oriented at a right angle (90 degrees) with respect to each other, the polarization of baluns 30A' and 30B' can have the same orientation. This right-angle configuration may save space, but it may also reduce cross-polarization isolation because the baluns are positioned closer to each other. (Alternatively, one balun could be located on either the x or y axis and the other balun could be located on the y axis below the radiator 20; but this extends the total length of the antenna device).

The dual feed balun 30 may be configured as a microstrip balun or a coaxial balun. We discuss examples of these embodiments below in more detail with respect to FIGS. 8-10.

Figure 8A:
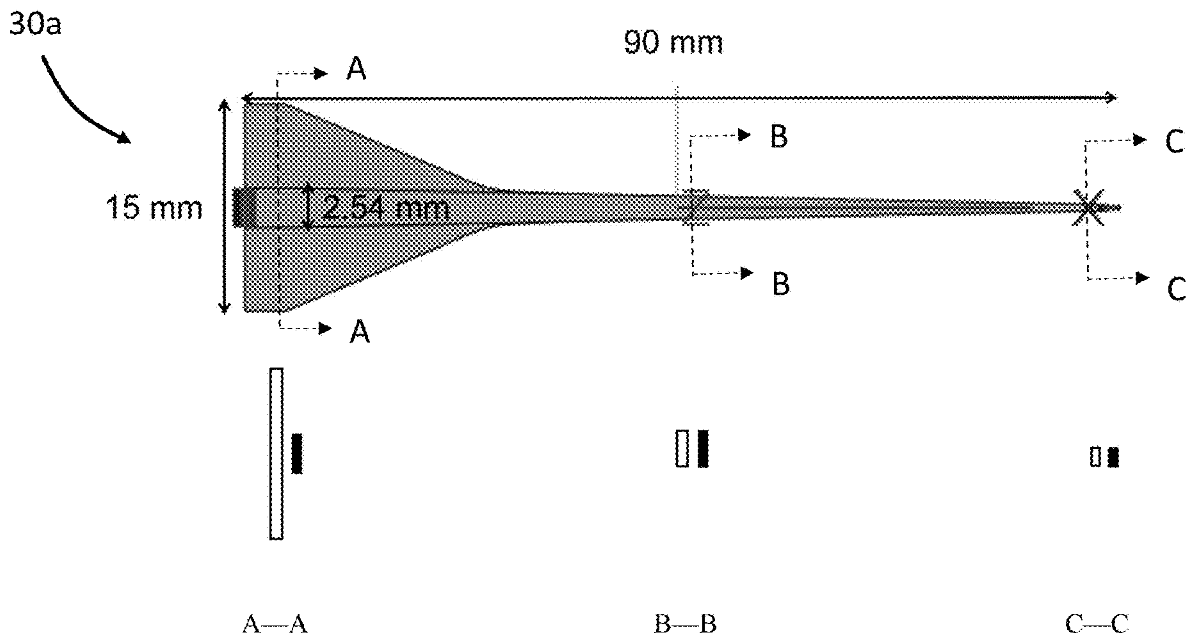
FIG. 8A (Related Art)
FIGS. 8A and 8B show two dual feed balun types according to embodiments where

FIG. 8A shows a microstrip tapered balun 30*a* which can be used for each of the individual baluns 30A, 30B for the dual feed balun 30 in accordance with an embodiment.

The microstrip tapered balun 30*a* may be configured as a so-called Klopfenstein taper which was described in Rizvi S A, Khan R A., "Klopfenstein tapered 2-18 GHz microstrip balun," Proceedings of 2012 9th International Bhurban Conference on Applied Sciences & Technology (IBCAST) 9 Jan. 2012, IEEE, pp. 359-362, herein incorporated by reference in its entirety. The Klopfenstein taper offers balanced performance in terms of the taper length and the reflection coefficient. It relies on a gradual tapper of cross section of the line which is defined by the equations involving the use of Bessel functions discussed in that paper; the equations for the taper make sure that the reflection coefficient is minimum over the pass band.

The tapered microstrip balun 30*a* is an impedance transformer network provide at the antenna feed 25. It provides impedance transformation over a large range of frequencies and also serves the purpose of conversion of single ended port to a balanced or symmetric port. For example, the tapered microstrip balun 30*a* may be comprised of two tapered lines etched on either side of a dielectric substrate.

As shown, the microstrip balun 30*a* tapers in cross-section from a wide width, at the input (left), to the antenna feed (right), where the lines are of substantially equal width. This makes the output lines balanced to connect to the two tapering arms 20$A_1$ and 20$A_2$ of the first pair 20A of tapering lines at the feed point 25 of the antenna 10. The balanced output lines of another microstrip balun 30*a* can similarly connect to the two tapering arms 20$B_1$ and 20$B_2$ of the second pair 20B of tapering arms at the feed point 25 of the antenna 10 too. (In theory, the balanced lines at the feed point should support only odd modes). The widths of the parallel strips at this feed point end can be found iteratively using the equations of the selected taper. The length of the taper is also given by a criterion which is specific to each taper.

The impedance at the balanced end should be known beforehand (according to the antenna requirements). The input impedance of the antenna 10 may be approximately 200 Ohm, for example. This requires the baluns 30A, 30B of the dual feed balun 30 to transition from a typical 50 Ohm un-balanced coaxial connector input to a balanced 200 Ohm impedance and the feed point 25 of the antenna 10.

The balun 30*a* has a length of 90 mm has a first conductive strip with initial width of 15 mm (at the left) which tapers down to about 2.54 mm and then tapers slightly more to a reduced width of approximately 1 mm at the signal input/output (at the right). The other conductive strip has an initial width of 2.54 mm (at the left) which tapers downward to approximately 1 mm at the signal input/output (at the right). (For ease of explanation, the dielectric material separating the two strips has not been illustrated.) These dimensions were chosen by taking the lowest required operating bandwidth of 2 GHz into consideration. Generally, the bottom line should be at least three to five times wider than the top line at the unbalanced end, and together the bottom and the top form a microstrip transmission line. This arrangement mimics the ground plane in a microstrip line. A few cross-sectional views are further included in the figure showing degree of tapering of the two lines. View A-A shows the microstrip near the signal input/output (left); the bottom line is much wider than the top line. View B-B shows the microstrip as it tapers; both lines taper in width. And the microstrip continues to taper in width until the two strips have the same width at the balanced end. View C-C shows the two balanced conductors.

The impedance profile presents a smooth curve along the length of the balun, but for the actual design here, we took a discrete number of points and then determined the required dimensions. Initially we used twenty such points and interpolated a smooth taper from the dimensions found. This helped to reduce unwanted resonances in the reflection coefficient profile. We modeled and simulated the balun design using FEKO software. The reflection coefficient, $S_{11}$, for balun 30*a* is better than-10 dB across 2-40 GHz as depicted in FIG. 8C ("Microstrip tapered balun" plot line).

Figure 8B:
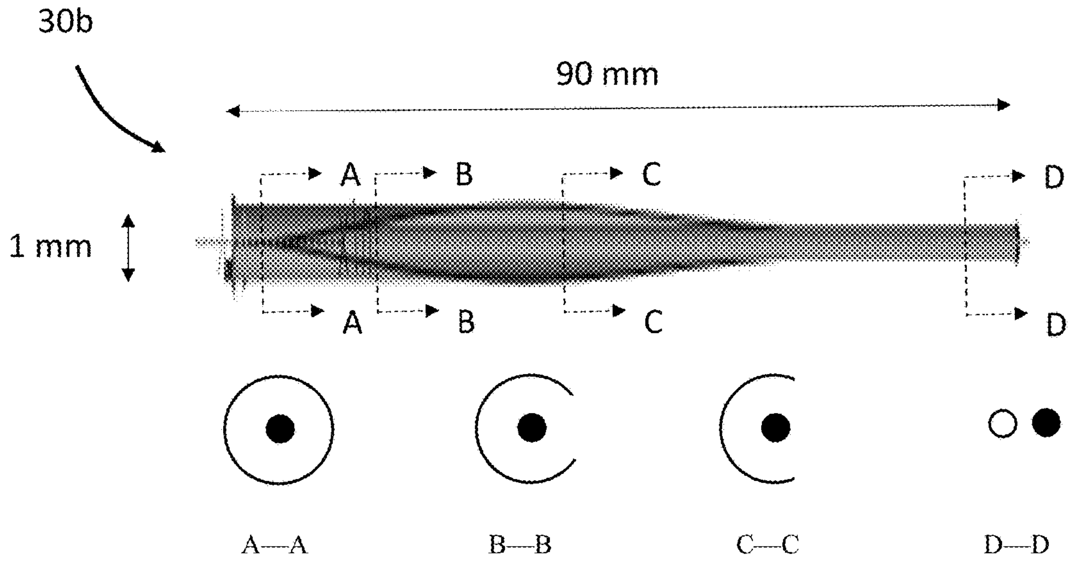
FIG. 8B (Related Art)
Figure 8C:
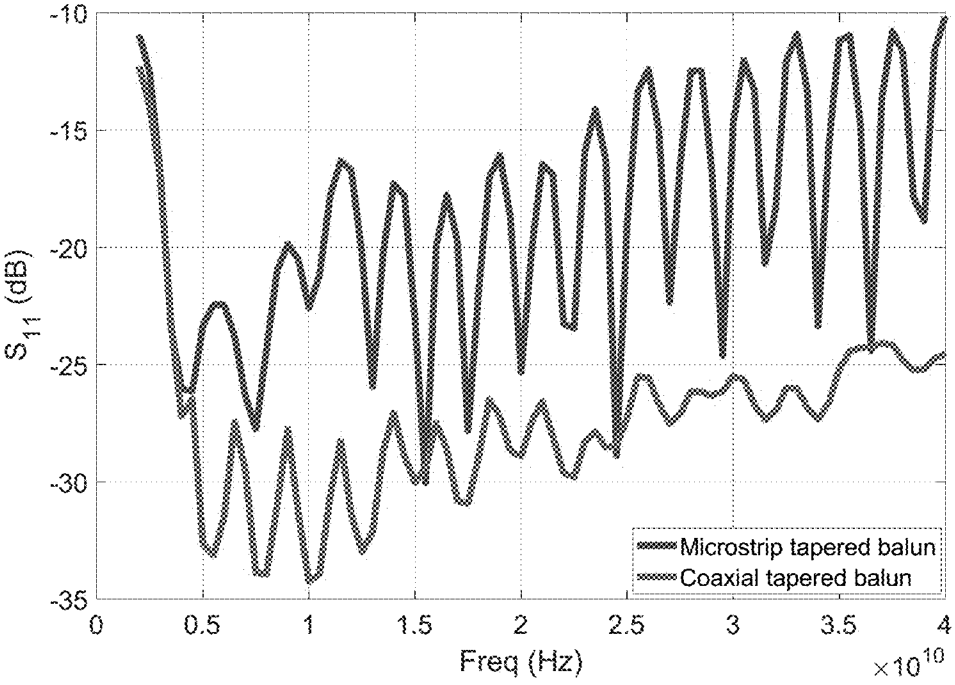
FIG. 8C is a plot comparing the Su reflection responses of the two dual feed baluns.

FIG. 8B shows a coaxial tapered balun 30*b* which can be used for each of the individual baluns 30A, 30B for the dual feed balun 30 in accordance with an embodiment.

The coaxial tapered balun 30*b* may be configured as a coaxial taper design. Such a design was introduced in J. W. Duncan and V. P. Minerva, "100:1 Bandwidth Balun Transformer," Proceedings of the IRE, February 1960, pp. 156-164, herein incorporated by reference in its entirety. The impedance matching transition from a coaxial line to balanced, two-conductor lines, is accomplished by cutting open the outer wall of the coaxial cable so that a cross-sectional view shows a sector of the outer conductor removed. As one progresses along the balun from the coaxial end, the cutting and opening of the outer conductor varies from zero to 360 degrees, yielding essentially two discrete and balanced conductor lines. The balun impedance is tapered so that the input reflection coefficient follows a Tchebycheff response in the pass band according to the equations discussed in that paper.

The balun 30*b* has a length of 90 mm and initial width of 1 mm at the signal input/output (left). These dimensions were also chosen by taking the lowest required operating bandwidth of 2 GHz into consideration. A few cross-sectional views are further included in the figure showing degree of the cutting and opening of the outer conductor wall of the coaxial cable. View A-A shows the initial coaxial cable having an inner conductor fully surrounded by an outer conductor. View B-B shows the outer conductor partially cut away. View C-C shows the outer conductor cut to a greater degree. The cutting continues until the outer conductor wall is fully cut away and becomes a conductive line itself which is the same size as the inner conductor. View E-E shows the balanced lines at the output.

The balanced output lines can connect to the two tapering arms 20$A_1$ and 20$A_2$ of the first pair 20A of tapering lines at the feed point 25 of the antenna 10. And the balanced output lines of another microstrip balun 30*b* can similarly connect to the two tapering arms 20$B_1$ and 20$B_2$ of the second pair 20B of tapering arms at the feed point 25 of the antenna 10. The reflection coefficient, $S_{11}$, for balun 30*b* is depicted in FIG. 8C ("Coaxial tapered balun" plot line). It is better than about-25 dB across the 2-40 GHz frequency band.

FIG. 8C is a plot showing the Su reflection response for an air-filled ultrawide-band 3D tapered aperture Vivaldi antenna using the microstrip tapered balun design in FIG. 8A compared to the same antenna using the coaxial tapered balun design in FIG. 8B. The data demonstrates that the coaxial tapered balun has lower Su response across the measured frequency spectrum. Its response may be preferred for certain antenna applications.

We next present two dual feed balun embodiments which are adapted for joining coaxial cables or other coaxial connections.

Figure 9A:
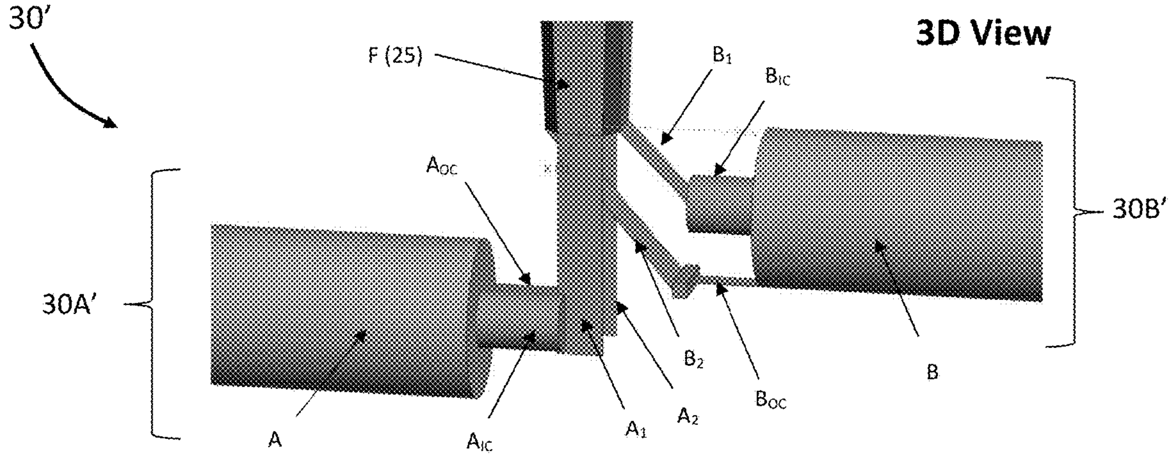
FIG. 9A-9D show a first dual coaxial balun design for a 3D Vivaldi antenna according to an embodiment, where
Figure 9B:
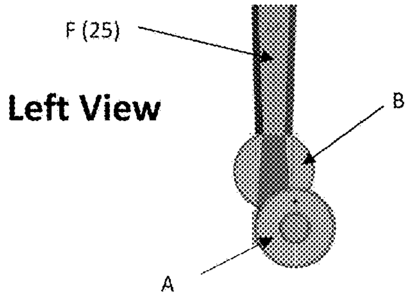
Figure 9C:
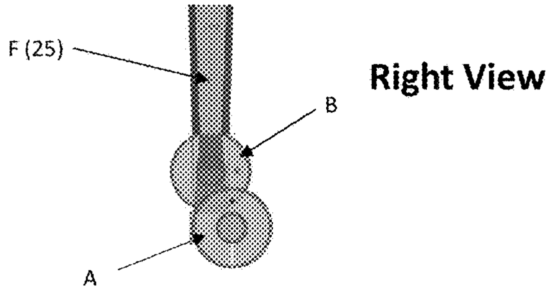
Figure 9D:
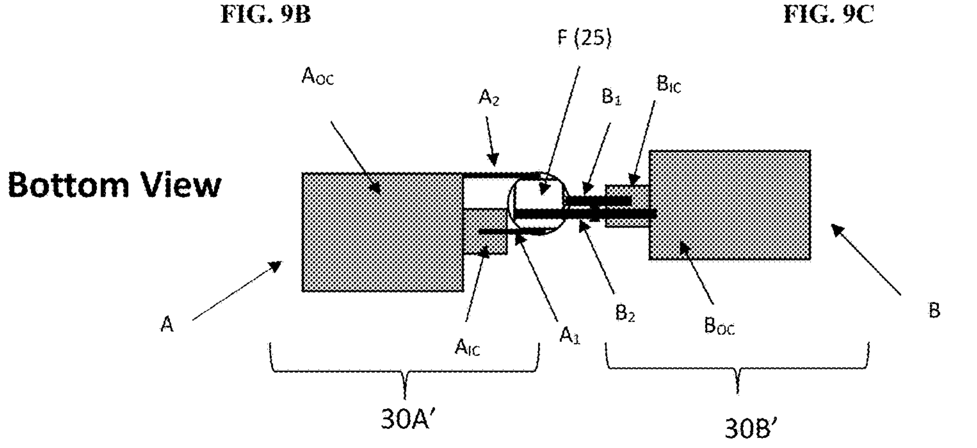
Figure 10A:
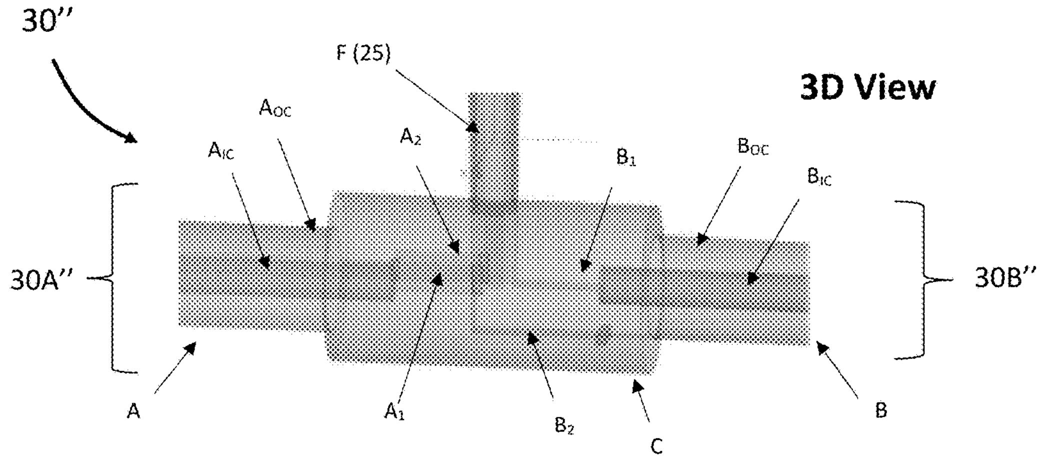
FIG. 10A-10D show a second dual coaxial balun design for a 3D Vivaldi antenna according to an embodiment, where
Figure 10B:
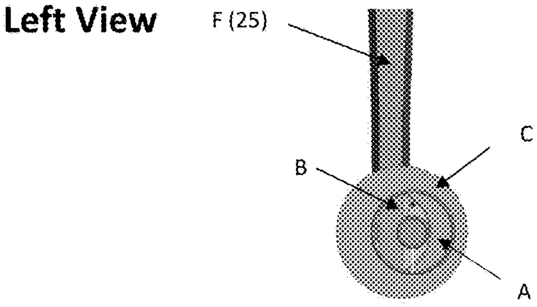
Figure 10C:
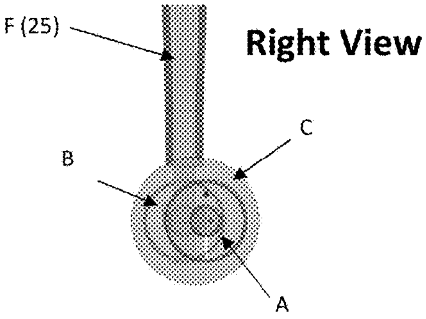
Figure 10D:
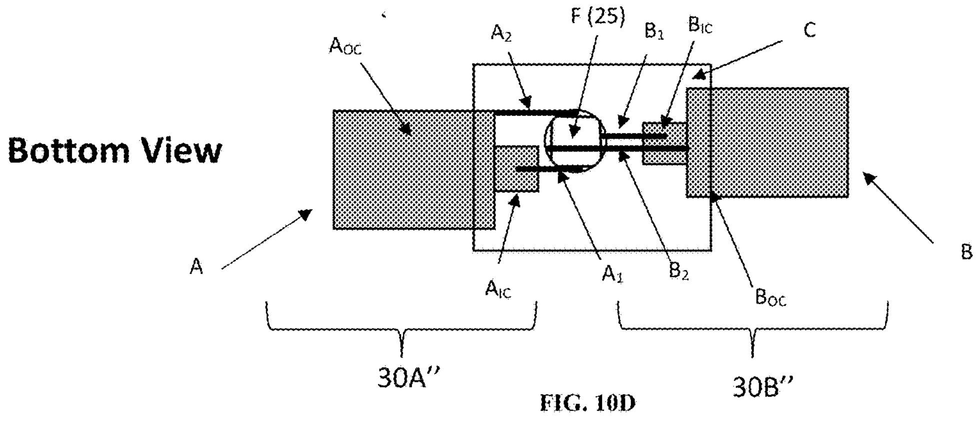

FIG. 9A-9D show a first dual coaxial balun 30' design for a 3D Vivaldi antenna according to an embodiment. More particularly, FIG. 9A is a 3D view, FIG. 9B is a left view, FIG. 9C is a right view and FIG. 9D is a bottom view of the first dual coaxial balun 30'. FIG. 10A-10D show a second dual coaxial balun 30" design for a 3D Vivaldi antenna according to an embodiment. More particularly, FIG. 10A is a 3D view, FIG. 10B is a left view, FIG. 10C is a right view and FIG. 10D is a bottom view of the first dual coaxial balun 30".

In these figures, a first balun 30A', 30A" is comprised of a left coaxial A that includes an inner conductor $A_{IC}$ surrounded by the outer conductor $A_{OC}$. Similarly, a second balun 30B', 30B" is comprised of a right coaxial B includes an inner conductor $B_{IC}$ surrounded by the outer conductor $B_{OC}$. The left and right coaxials A, B connect to respective signal inputs/outputs for the antenna. They could be coaxial cable themselves or provide a coupling to connect to such cables. The outer surface of the coaxial A and B act as protective shell which is made by very low dielectric constant material (e.g., ~1.5). The inner and outer conductors of the coaxial are separated by non-conducting dielectric material as in conventional. The conductors and feed connection lines may be fabricated from a metal/alloy like those of copper or aluminum typically used for RF/electrical connection.

Feed connections $A_1$, $A_2$ extend from the inner conductor $A_{IC}$ and at the rear side of outer conductor $A_{OC}$ of coaxial cable A (i.e., at its 3 'o clock position), respectively. Similarly, feed connections $B_1$, $B_2$ extend from the inner conductor $B_{IC}$ and at the bottom of the outer conductor $B_{OC}$ of coaxial cable B, respectively (i.e., at its 6 'o clock position).

The four feed connections $A_1$, $A_2$, $B_1$, and $B_2$ connect to the feed F at the feedpoint 25 of the antenna 10 (which connects to the four arms 20$A_1$, 20$A_2$, 20$B_1$, and 20$B_2$ of the radiator 20). Those four connections remain electrically isolated from each other.

Referring to the first dual coaxial balun 30' design in FIG. 9A, feed connections $A_1$, $A_2$ of left coaxial A extend to the right, turn upward (e.g., 90 degrees) and extend further upward to connect to the feed F. On the other hand, feed connections $B_1$, $B_2$ of the right coaxial B extend to the left, bend at an angle (e.g., less than 90 degrees) upward, and extend further to connect to the feed F. In this way, the pairs of feed connections $A_1$, $A_2$ and $B_1$, $B_2$ have an interdigitated arrangement with each pair rotated 90 degrees from each other. This arrangement is somewhat similar to the U-joints of a universal joint. The two coaxial A, B are thus staggered with respect to each other to accommodate their four terminal connections to the 3D Vivaldi antenna. The two baluns 30A' and 30B' are offset in both z and x (and/or y axis) to these ends. This is shown more clearly in the side views shown in FIGS. 9B and 9C. Looking at the bottom view in FIG. 9D, feed connections $A_1$, $A_2$ connect at the feed F at its 6 'o clock and 12 'o clock positions, respectively. And feed connections $B_1$, $B_2$ connect at the feed F at its 3 'o clock and 9 'o clock positions, respectively.

The RF performance of the first dual coaxial balun 30' design has been found to be generally good. Although, the durability at the feed location may not be so robust due to the physical imbalance between the coaxials A and B. Thus, to reinforce the antenna durability at the feed location, we present a second dual coaxial balun 30" design for a dual polarization 3D Vivaldi antenna in FIGS. 10A-10D. By aligning the coaxial baluns 30A" and 30B" in the z direction, the durability of the dual feed balun 30 is much improved. More particularly, the coaxial cables of the dual feed balun are at the same height but merely offset in the x axis (although, they could be offset in the x-axis and/or y-axis). This also offers the balance between the coaxial baluns and covering inner connection also at the feed location 25.

Referring to the second dual coaxial balun 30" design in FIG. 10A, feed connections $A_1$, $A_2$ of left coaxial A extend to directly to the right to connect to the feed F. On the other hand, feed connections $B_1$, $B_2$ of right coaxial B extend to the left, bend at an angle upward, and extend further to connect to the feed F. In this way, the pairs of feed connections $A_1$, $A_2$ and $B_1$, $B_2$ still have an interdigitated arrangement, with each pair rotated 90 degrees from each other. The two coaxial A, B are still staggered with respect to each other; however, the two baluns 30A" and 30B" are only offset in x-axis and/or y-axis. Otherwise, they lie at the same general position along the z-axis. This is shown more clearly in the views shown in FIGS. 10B and 10C. Looking at the bottom view in FIG. 10D, feed connections $A_1$, $A_2$ connect at the feed F at its 6 'o clock and 12 'o clock positions, respectively. And feed connections $B_1$, $B_2$ connect at the feed F at its 3 'o clock and 9 'o clock positions, respectively. Those four connections to the feed F may all be straight solder or weld (e.g., 0, 90 or 180 degrees) connections which further enhances robustness of the dual feed balun.

While not fully shown here, in the coaxial balun, the impedance transformation from say 50 to 200 Ohms, may be achieved by gradually cutting out the outer conductor as depicted in FIG. 8B going from sections A-A to B-B, C-C and D-D.

The dual feed baluns may include a housing C (see FIG. 10A) which joins and protects the individual balun structures. The housing C may be formed, for instance, by encasing the structures in isolating thermoplastic or resin to provide greater stability and to keep the conductive feed connections from shorting.

Figure 11:
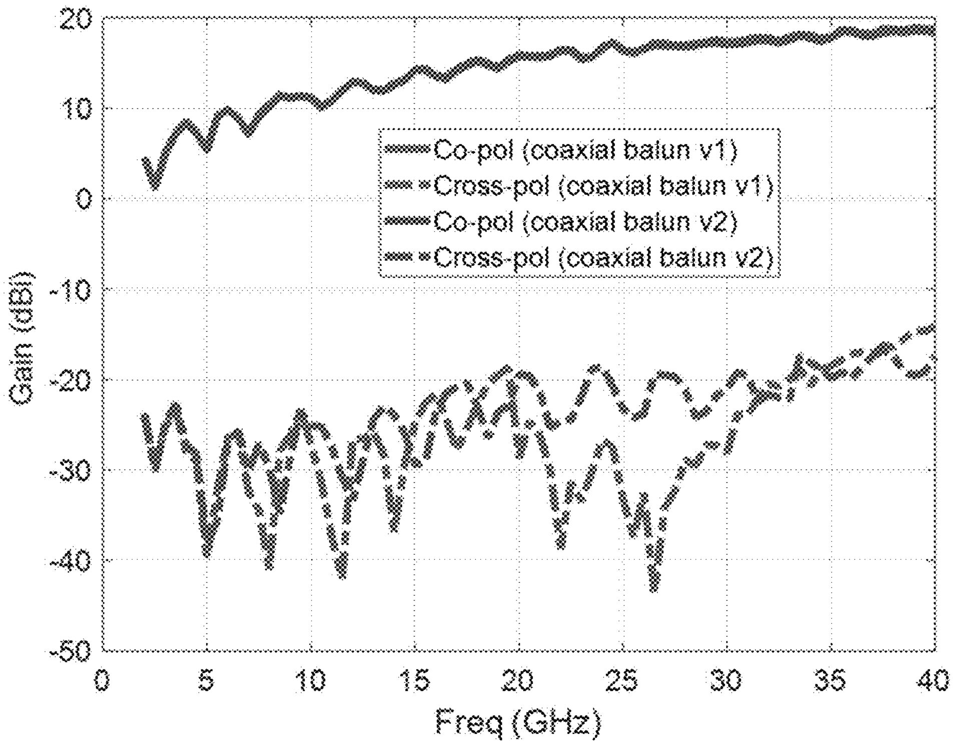
FIG. 11 is a plot showing the gain performance of the first coaxial balun design depicted in FIG. 9A-9D and the second coaxial balun design depicted in FIGS. 10A-10D for a 3D Vivaldi antenna according to case 1.

FIG. 11 is a plot showing the gain performance of the first coaxial balun (v1) design depicted in FIG. 9A-9D and the second coaxial balun (v2) design depicted in FIGS. 10A-10D for a 3D Vivaldi antenna according to case 1. The data shows the gains results are very similar across the frequency band for the two coaxial designs. The first coaxial balun (v1) design has a slightly more consistent gain profile than that of the second coaxial balun (v2) design, esp. between about 20-30 GHz. However, the second coaxial design (v2) is much more durable at the feed connection with the same RF performance in comparison to the first coaxial balun (v1) design.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. An ultrawide-band dual polarization 3D tapered aperture Vivaldi antenna comprising:

a radiator having two pairs of tapering arms, each pair corresponding to a different polarization and the tapering arms spaced thereof closest to one another at a feed point location of the antenna and taper outwardly in opposite directions, thus forming a 3D Vivaldi antenna aperture therebetween; and a dual feed balun connecting to each of the two pairs of tapering arms and providing a separate channel for each of the polarizations.

2. The antenna according to claim 1, wherein the tapering arms of the two pairs of tapering arms each have a length L and a width w, and taper from a minimum spacing distance therebetween $d_0$ at the feed point to a maximum spacing distance therebetween $d_L$ at the aperture point in a direction z.

3. The antenna according to claim 2, wherein the tapering arms of the two pair of tapering arms each have an exponential or linear taper.

4. The antenna according to claim 3, wherein the spacing d of the tapering arms of the two pairs of tapering arms is given as an exponential function of the distance in the direction z as follows:

$$d(z) = d_0 e^{bz}, \text{ where } b = \frac{1}{L} \ln\left(\frac{d_L}{d_0}\right).$$

5. The antenna according to claim 4, wherein the width w of the tapering arms of the two pairs of tapering arms is given as a function of the distance in the direction z as follows:

$$w(z) = \frac{d(z)}{Z(z)}\eta,$$

where Z(z) is the characteristic impedance as a function of z and η is the free space impedance.

6. The antenna according to claim 1, wherein the two pairs of tapering arms are arranged 90 degrees with respect to one another.

7. The antenna according to claim 6, wherein there is at least 25 dB of isolation between the polarization channels.

8. The antenna according to claim 1, wherein the aperture is air-filled.

9. The antenna according to claim 1, wherein the aperture is at least partially filled with a dielectric material.

10. The antenna according to claim 9, wherein the filled dielectric material completely fills the aperture.

11. The antenna according to claim 10, wherein the top surface of the dielectric material in the aperture is substantially flat.

12. The antenna according to claim 11, wherein the dielectric material further comprises a convex-shaped dome extending from the center of the top surface thereof which focuses RF energy to the aperture.

13. The antenna according to claim 12, wherein the convex-shaped dome is a radially symmetrical sector of a hemispherical dome.

14. The antenna according to claim 1, wherein the dual feed balun comprising two coaxials one feeding each polarization channel of the antenna.

15. The antenna according to claim 14, wherein the coaxials of the dual feed balun are offset at different heights in the z-axis and in the x and/or y axis.

16. The antenna according to claim 14, wherein the coaxials of the dual feed balun are at the same height but offset in the x and/or y axis.

17. The antenna according to claim 14, wherein the dual feed balun comprises two microstrip tapered baluns or two coaxial tapered baluns.

18. The antenna according to claim 1, wherein the dual feed balun comprises two baluns which are: (i) arranged in opposing directions with the polarization of two baluns oriented 90 degrees with respect to each other, or (ii) arranged at right angles with respect to one other with the polarization of the two baluns oriented in the same direction, to maintain cross-polarization isolation.

19. The antenna according to claim 1, wherein the tapering arms of the two pairs of tapering arms are formed of metal or alloy.

20. The antenna according to claim 1, wherein the antenna is configured to have an operating frequency of about 2-40 GHz, a 20:1 bandwidth, 2-17 dB of gain, a return loss of better than −10 dB, and at least 30 dB cross-polarization isolation (CPI) up to about 35 GHz.

21. The antenna according to claim 20, wherein the aperture is air filled, the length L is about 110 mm and the maximum spacing distance therebetween $d_L$ is about 123 mm.

22. The antenna according to claim 20, wherein the aperture is filled with a dielectric material having a dielectric constant of about 2.2 with a flat top surface, the length L is about 75 mm and the maximum spacing distance therebetween $d_L$ is about 83 mm.

23. The antenna according to claim 20, wherein the aperture is filled with a dielectric material having a dielectric constant of about 2.2 with a flat top surface and a convex-shape dome extending about 20 mm above the center of the top surface thereof, the length L is about 75 mm and the maximum spacing distance therebetween $d_L$ is about 83 mm.

24. The antenna according to claim 20, wherein the aperture is filled with a dielectric material having a dielectric constant of about 2.2 with a flat top surface and a convex-shape dome extending about 20 mm above the center of the top surface thereof, the length Z is about 55 mm and the maximum spacing distance therebetween $d_L$ is about 83 mm.

* * * * *